United States Patent [19]
Pirrung et al.

[11] Patent Number: 5,595,770
[45] Date of Patent: Jan. 21, 1997

[54] GRANULATING DEVICE FOR STRAND MATERIALS

[75] Inventors: Walter Pirrung, Grossostheim; Berthold Glabb, Hösbach; Laurenz Hohm, Grossostheim; Helmuth Meidhof, Grossostheim; Günther Wolf, Grossostheim, all of Germany

[73] Assignee: Rieter Automatik GmbH, Germany

[21] Appl. No.: 422,852

[22] Filed: Apr. 17, 1995

[30] Foreign Application Priority Data

Apr. 20, 1994 [DE] Germany .......................... 44 13 716.8

[51] Int. Cl.⁶ .............................. B29B 9/00; B29C 47/00
[52] U.S. Cl. ......................... 425/188; 425/151; 425/308
[58] Field of Search ..................................... 425/188, 151, 425/308; 192/135

[56] References Cited

U.S. PATENT DOCUMENTS

| | | | |
|---|---|---|---|
| 1,658,020 | 1/1928 | Marble | 192/135 |
| 4,632,752 | 12/1986 | Hunke | 425/308 |
| 5,182,115 | 1/1993 | Nogossek et al. | 425/308 |

FOREIGN PATENT DOCUMENTS

| | | |
|---|---|---|
| 2618369 | 1/1989 | France . |
| 2733320 | 2/1979 | Germany . |
| 3900250 | 7/1990 | Germany . |
| 2058991 | 4/1981 | United Kingdom . |

OTHER PUBLICATIONS

Patent Abstracts of Japan, vol. 9, No. 60 (M-364). Abstract of Kokai 59-195,432 which was published Nov. 6, 1984.

*Primary Examiner*—Robert Davis
*Attorney, Agent, or Firm*—Banner & Witcoff, Ltd.

[57] ABSTRACT

The invention relates to a granulation apparatus for strand material having pull-in apparatus for gripping the strand material and transporting it to a counter knife, a knife roll cooperating with the counter knife for cutting the strand material into granulate, and a housing accomodating the pull-in apparatus, the counter knife and the knife roll, wherein a motor driving the knife roll and the pull-in apparatus is arranged beside the housing and is connected by means of a drive axle to the rotating components contained in the housing, and wherein the motor and the housing are mounted on a common support. The mounting assembly includes two mounting devices which, in a projection onto the support, are arranged in the region of the two side portions of the housing which are beside said drive axle such that, due to the torque acting on the housing, the one mounting device (tension holding device) receives a tensile force away from the support and the other mounting device (the pressure holding device) receives a force of pressure against the support. The tension holding device, due to its hook-like formation, releasably holds the housing onto the support, and the pressure holding device is formed as a catch, thus preventing movement of the housing away from the tension holding device.

3 Claims, 1 Drawing Sheet

STRAND INFLOW

GRANULATING DEVICE FOR STRAND MATERIALS

BACKGROUND OF THE INVENTION

The invention relates to a granulation apparatus for strand material having pull-in means for gripping said strand material and transporting it to a counter knife, a knife roll cooperating with said counter knife for cutting said strand material into granulate, and a housing accomodating said pull-in means, said counter knife and said knife roll, wherein a motor driving said knife roll and said pull-in means is arranged beside said housing and is connected by means of a drive axle to the rotating components contained in said housing, and wherein said motor and said housing are mounted on a common support.

DESCRIPTION OF THE PRIOR ART

Such a granulation apparatus together with a feeding means for plastic strands is disclosed in DE-OS 39 00 250. The granulation apparatus therein is mounted on a support consisting of a block and a base plate on which the granulation apparatus is mounted.

For the maintenance and repair of such a granulation apparatus it is necessary to, on the one hand, separate the granulation apparatus from the feeding means, for which purpose a wagon is shown in FIG. 2of DE-OS 39 00 250, which wagon forms a movable support by virtue of attached wheels. Further, it is also necessary to make the rotating components of the granulation apparatus accessible for the purpose of maintenance or repair, for which purpose the housing together with the components accomodated therein is normally separated from the motor and removed from the support. For the purpose of this separation, a removable clutch is commonly provided between the motor and the drive axle extending into the housing. For an inspection of the granulation apparatus, the motor can then remain mounted to the support. In order to provide the housing with a secure hold on the support, the housing until now has been mounted to the support with screws or the like, which therefore, had to be individually released in order to remove the housing from the support. For the re-mounting of the housing then naturally the respective screws had to be individually tightened again. For reasons of noise control, such screws were often arranged behind sound insulation walls, which hindered the accessibility of the screws for the removal and re-mounting of the housing.

SUMMARY OF THE INVENTION

It is the object of the invention to simplify the connection between the housing and the support while maintaining a solid mounting. According to the invention, this is achieved in that the mounting assembly comprises two mounting means which, in a projection onto said support, are arranged in the region of the two side portions of said housing which are beside said drive axle such that, due to the torque acting on said housing, the one mounting means (tension holding means) receives a tensile force away from said support and the other mounting means (the pressure holding means) receives a force of pressure against said support, wherein said tension holding means, due to its hook-like formation, releasably holds said housing on to said support, and wherein said pressure holding means is formed as a catch preventing movement of said housing away from said tension holding means.

With such an mounting of the housing to the support, the torque transmitted from the drive axle to the housing is made use of, which torque gives the housing a tendency to rise on the one side away from the support and to press against the support with its other side. By making use of this torque, the tension holding means ensures that the housing cannot rise away from the support on the side of the tension holding means, wherein, however, at the same time it presses on the pressure holding means, preventing a movement of the housing away from the tension holding means. The housing therefore is securely held against the support during operation of the rotating components and can not move with respect to these due to the locking effect of the pressure holding means. In the case of a necessary removal of the housing together with the components accomodated therein, the housing is to be separated from the drive axle while the motor is turned off, whereafter the housing can be lifted on the side of the pressure holding means, whereby the locking otherwise present with the pressure holding means is canceled. Thereafter, the housing can be pulled out of the tension holding means due to its hook-like formation, whereby it can be lifted from the support without any further manipulation being necessary hereto.

Suitably, a pair of tension holders and a pair of pressure holding means are respectively arranged on either relevant side of the housing in parallel to the drive axle so that this results in respectively two mounting positions along the housing in the direction of the drive axle, thus, a total of four mounting positions in which the housing can be attached symmetrically and particularly securely to the support. It goes without saving that it is also possible, in particular with smaller granulation apparatus to provide only one tension holding means and one pressure holding means respectively on either side of the housing, as long as the mounting assembly satisfies the requirements with regard to security and stability.

Advantageously, the tension holding means is formed as a block mounted to the support having a projection overlapping a housing section, and the pressure holding means is formed as a peg attached to the support and fitting into a seat in the housing. The block with its projection overlapping a housing section thereby pulls the housing against the support, when the housing tends to rise with respect to the support under the influence of the torque acting thereon, wherein movement of the housing with respect to the support is prevented by means of the peg attached to the support, fitting into a seat in the housing. This seat is a round recess, which, if the need be, can be provided with a cone for exact centering, this cone fitting to a corresponding counter cone of the peg. For removing the housing, the housing is then raised with respect to the peg, whereby the hook-like mounting above the tension holding means can be removed, whereby the complete removal of the housing from the support is then possible.

BRIEF DESCRIPTION OF THE DRAWINGS

An embodiment of the invention is illustrated in the figures.

DESCRIPTION OF THE PREFERRED EMBODIMENTS

Figure 1:
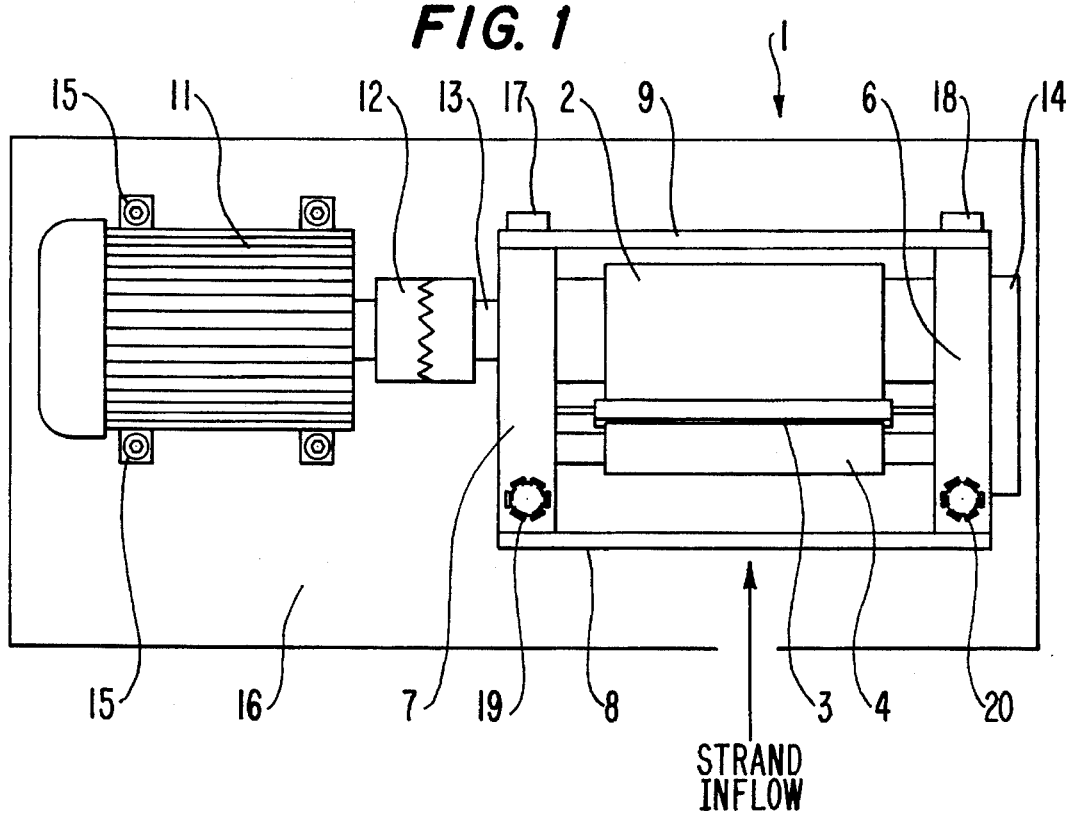
FIG. 1 shows a plan view of a support with a motor and granulation apparatus mounted thereon.

The granulation apparatus 1 illustrated in FIG. 1 consists of the knife roll 2, the counter knife 3 and the pull-in roll 4.

Figure 2:
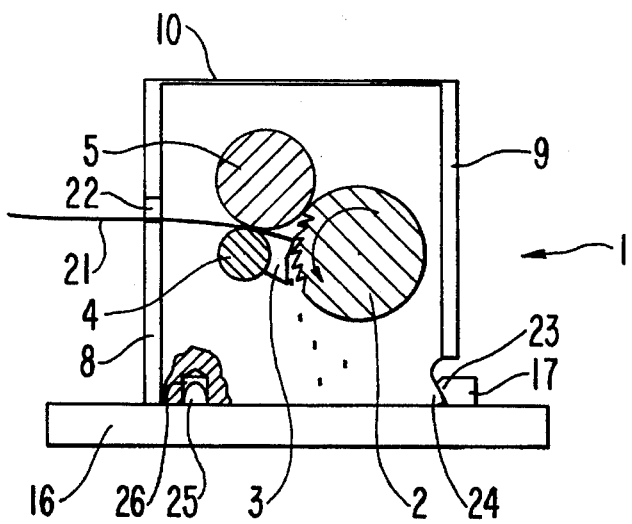
FIG. 2 shows a side view of the granulation apparatus resting on the support.

For reasons of clarity of the illustration in FIG. 1, the pull-in roll 5 resting there above, as can be seen from FIG. 2, is not shown. These components are arranged in a known manner at the side of the walls 6 and 7 of the housing, which further consists of the front wall 8 and the rear wall 9. The lid 10 illustrated in FIG. 2 is not shown in FIG. 1 in order to allow a view into the interior of the housing formed by components 6, 7, 8, 9 and 10.

The motor 11 is arranged beside the granulation apparatus 1, the motor being connected by means of a disengageable clutch 12 to the drive axle 13 for the rotating components of the granulation apparatus 1. The drive axle 13 acts directly on the knife roll 2. The drive of the two pull-in rolls 4 and 5 is then accomplished over a gear 14 attached to the knife roll 2.

The motor 11 is screwed to the support 16 by means of bolts 15. The mounting of the granulation apparatus 1 to the support 16 occurs by means of two tension holding means 17 and 18, and the pressure holding means 19 and 20, whose forms will be explained in more detail in connection with FIG. 2.

For removing the granulation apparatus 1 the clutch 12 is disengaged and the granulation apparatus is raised with its front wall 8 from the support, whereby the pressure holding means 19 and 20, which serve as a catch, release the walls 6 and 7 so that the tension holding means 17 and 18 are released by sliding the granulation apparatus 1 in the direction of the tension holding means 17 and 18 away from their catch means, and thus the support 16 can be raised.

FIG. 2 shows the granulation apparatus according to FIG. 1 in a side view, wherein the wall 6 has been removed so that the counter knife 3, by which the granulated strains 21 are fed in, the knife roll 2 and the two pull-in rolls 4 and 5 are visible. A slot 22 for feeding the plastic strands 21 is provided in the front wall 8.

The tension holding means 17, here formed by a block, is mounted on the support 16 formed here as a base plate wherein the side of which block facing the granulation apparatus is formed by a slanted projection 23. The projection 23 overlaps a suitably formed housing section 24 so that the projection 23 holds in place the rear wall 9 and thus the granulation apparatus 1 against the tension forces pointing away from the support 16. These tension forces can develop with the introduction of torque on the knife roll 2, which during operation rotates according to the indicated arrow and which, due to the torque acting on it, exerts a tension of the housing section 24 against the projection 23.

Further, the peg 25 is mounted to the support 16, the peg extending into the bore 26 in the granulation apparatus 1 forming the seat thereof when the granulation apparatus 1 is mounted on the support. This bore extends into a housing section which belongs to the side wall 6 or 7, respectively. The peg 25 is formed conically and fits into a corresponding counter cone of the bore 26, whereby the exact position of the granulation apparatus 1 with respect to the support 16 is defined. The peg 25 further has a rounding at its end extending into the bore 26 which facilitates the fitting of the granulation apparatus 1 onto the peg 25.

It should further be noted that with the arrangement according to FIG. 2, the peg 25 and the tension holding means 17 are each provided twice as a matter of course, as becomes evident from FIG. 1.

For removing the granulation apparatus 1 from the support 16, the granulation apparatus 1 is at first raised with its front wall 8 from the support 16 until the peg 25 no longer extends into the bore 26, whereby the granulation apparatus 1 can be removed in the direction of the tension holding means 17. Thereby, the projection 23 releases the otherwise overlapping housing section 24 so that the granulation apparatus can now be lifted from the support.

We claim:

1. Granulation apparatus (1) for strand material (21) having pull-in means (4,5) for gripping said strand material (21) and transporting it to a counter knife (3), a knife roll (2) cooperating with said counter knife (3) for cutting said strand material (21) into granulate, and a housing (6,7,8,9,10) accomodating said pull-in means (4,5), said counter knife (3) and said knife roll (2), wherein a motor (11) driving said knife roll (2) and said pull-in means (4,5) is arranged beside said housing (6,7,8,9,10) and is connected by means of a drive axle (13) to said knife roll and pull-in means contained in said housing (6,7,8,9,10) and wherein said motor and said housing are mounted on a common support (16), the improvement comprising a mounting assembly including a tension mounting means (17,18) and a pressure mounting means (19,20) which project from said support and are arranged in the region of the two side portions (8,9) of said housing which are so located beside said drive axle that, due to the torque acting on said housing, the tension mounting means receives a tensile force directed away from said support and the pressure mounting means receives a pressure force directed toward said support, said tension mounting means having a hook-shaped portion releasably holding said housing (6,7,8,9,10) onto said support (16), and said pressure holding means (19,20) having a catch which prevents movement of said housing away from said tension mounting means.

2. Granulation apparatus according to claim 1 in which a pair of said tension mounting means (17,18) and a pair of said pressure mounting means (19,20) are respectively arranged on either side (8,9) of said housing (6,7,8,9,10) in parallel to said drive axle (13).

3. Granulation apparatus according to claim 1 or 2, in which said tension mounting means comprises a block (17) mounted on said support (16), said block having a projection (23) overlapping a housing section (24) at a slant angle, and said pressure mounting means comprises a peg (25) mounted on said support (16) and fitting into a seat provided in said housing.

\* \* \* \* \*